United States Patent [19]

Herb

[11] Patent Number: 4,545,272
[45] Date of Patent: Oct. 8, 1985

[54] STAMPING OR NIBBLING MACHINE

[75] Inventor: Eugen Herb, Ditzingen, Fed. Rep. of Germany

[73] Assignee: Trumpf GmbH & Co., Fed. Rep. of Germany

[21] Appl. No.: 416,604

[22] Filed: Sep. 10, 1982

[30] Foreign Application Priority Data

Sep. 11, 1981 [DE] Fed. Rep. of Germany ....... 3136991

[51] Int. Cl.[4] .......................... B26D 5/02; B23D 27/00
[52] U.S. Cl. ........................................ 83/165; 83/395; 83/467 A; 83/635; 83/916
[58] Field of Search ............. 83/635, 916, 395, 467 A, 83/698, 165, 640

[56] References Cited

U.S. PATENT DOCUMENTS

| 1,849,829 | 3/1932 | Gray | 83/640 |
| 2,699,830 | 1/1955 | Hodge | 83/637 |
| 3,163,068 | 12/1964 | Leibinger | 83/635 |
| 3,174,376 | 3/1965 | Herb | 83/395 |
| 3,481,236 | 12/1969 | Nicklassen | 83/916 |
| 3,665,795 | 5/1972 | Mayer | 83/395 |
| 3,760,676 | 9/1973 | Daniels | 83/916 |
| 3,777,601 | 12/1973 | Strandell | 83/698 |
| 4,012,975 | 3/1977 | La Lone | 83/916 |

FOREIGN PATENT DOCUMENTS 1128259 4/1962 Fed. Rep. of Germany .

Primary Examiner—James M. Meister
Assistant Examiner—John L. Knoble
Attorney, Agent, or Firm—McGlew and Tuttle

[57] ABSTRACT

A stamping or nibbling machine for cutting pieces off a metal workpiece comprises a hollow punch adapted to be driven against the workpiece to win small pieces thereof. A die having an opening therethrough is adapted to be located in alignment with the punch and on the other side of the workpiece. A centering pin has one end projecting into the interior of the punch and an opposite end extending out of the punch and adapted to engage into the opening beyond the position of the workpiece and a displacing mechanism for the pin is carried within the hollow punch and is advantageously in the form of a coil spring located between a collar at the inner end of the punch and the inner wall of the hollow workpiece which moves the outer end of the centering pin into association with a centering pin mounted within the die below the opening thereof.

8 Claims, 3 Drawing Figures

STAMPING OR NIBBLING MACHINE

FIELD AND BACKGROUND OF THE INVENTION

This invention relates in general to stamping or nibbling machines and in particular to a new and useful stamping or nibbling machine which includes a hollow punch which is driven by a drive member to stamp or nibble a workpiece. The machine includes a spring in its interior located between the inner end of a centering pin and the interior of the punch and provides a displacing mechanism for the centering pin which moves through an opening of a counter die positioned on the other side of the workpiece.

A machine, similar to the invention is disclosed in German AS No. 11 28 259 dated Apr. 19, 1962, for example. By firmly retaining the free end portion of the pin in the directions transverse to the longitudinal axis thereof, pin takes up both the cutting pressure and the shocks caused by the displacement of the tool and workpiece relative to each other. The shocks occur in rapid succession especially in nibbling operations. In the retracted position, the working space between the punch and die is free, so that the workpiece can be inserted and moved without obstacles. Prepunching of the workpiece is not necessary in this prior art machine, this operation is rather effected by the pin in cooperation with an auxiliary die which can be moved in. A powerful drive of the pin is required for this purpose. How this drive is designed cannot be learned from the disclosure. However, it follows clearly from the description that a quite ample space is needed for the drive which moves the auxiliary die and that a special construction is needed for the die which normally operator with the nibbling punch. Consequently, this design does not comply with the needs of an automatic tool change operation, neither on the punch side nor on the die side. This further follows from the fact that because of its separate drive, the pin must project upwardly beyond the tubular punch and that, for changing the tool, both the pin and the punch must be uncoupled. In another embodiment of this prior art machine, the free end of the pin is designed as a drill bit, which makes the auxiliary die dispensable, yet requires a locking device instead, which must be pneumatically or hydraulically actuated in a similar way. In addition, a special drive is needed for the drill, which drive is particularly expensive since the upper end of the drill extends in the direction of the punch drive, which is mostly a crank drive, and the construction in the drive area becomes complicated.

SUMMARY OF THE INVENTION

The invention is directed to an improvement of a punching machine making the guide pin retractable by means of a simple mechanism, and permitting an automatic change of the tool which, tool comprising at least two parts.

In accordance with the invention, a stamping or nibbling machine for cutting a workpiece comprises a hollow punch which is adapted to be driven against the workpiece to stamp or nibble small pieces or chips of the workpiece away. The punch cooperates with a die having an opening adapted to be located in alignment with the punch and on an opposite side of the workpiece. The punch further includes a centering pin having one end projecting into the interior of the hollow punch and an opposite end extending out of the punch and adapted to engage in the opening beyond the position of the workpiece. The invention also includes a displacing mechanism located within the punch which is effected to move the pin outwardly to a position outside the range of displacement of the workpiece.

Since the pin can be lifted and is entirely accommodated in the punch, no special uncoupling thereof from its displacing drive is needed during a tool change. Further, the drive for retracting the pin can be accommodated without problems, and the drive of the punch may at least substantially be of usual design. The die also may correspond to a conventional one, at least substantially, in shape and size. The same goes for the seat of the die. The means for retracting the pin may be very simple and need not produce any particular force since the initial piercing of a workpiece to form a first hole, if necessary, is effected by the punch itself. The pin, the punch and the die may be of simple design, so that their manufacturing costs are low.

The pin may be lifted indirectly, through the punch, by providing that the punch is movable oppositely to its working direction beyond its upper dead center position until the maximally extended pin comes outside the displacement range of the workpiece. However, it may also be provided to use compressed air, for example, for moving the pin against the force of a spring until the free end of the pin enters the punch completely. It is particularly advantageous to connect the die and the pin holder directly to each other since they can be exchanged in a single operation along with the punch.

In a particularly advantageous embodiment of the invention, the pin, more particularly the inner end thereof, is provided with a collar which, in working position, applies against a shoulder inside the punch. One end of a loading spring, which is preferably a helical compression spring, bears against the collar or pin side remote from the shoulder, while the other end of the spring bears against the inside of the inner end of the punch. This inner end of the punch must be provided with a removable cover or another removable element suitable for backing up the spring and permitting mounting of the pin and the spring.

The pin, at its end which projects out of the associated punch beyond the cutting edge of the punch, is reduced by a step to a smaller cross section so that in the upper dead center position of the punch, the lower end of the larger diameter portion extends into the working space between the punch and the die so that it projects into the range of movement of the workpiece.

If the machine, as usual, is employed for machining workpieces, particularly metal sheets, of unequal thicknesses, the pin dimensions are adjusted to the thinnest workpiece. Upon moving the workpiece and the tool relative to each other, the workpiece must butt against the pin portion having the larger cross section. A free space remains between the respective edge of the workpiece and the pin portion with the smaller cross section, which space depends on the cross-sectional reduction. Chips which are cut from the workpiece can move into this space and then fall through a die aperture into a chip chute, or through an opening into the die seat. The cross-sectional reduction is not necessarily provided along the entire circumference. If the punch and the pin are not rotatable, this reduction may be restricted to the side of the pin facing the workpiece. It is also possible to adapt to the changed thickness of the workpiece by exchanging at least the punch with the pin, for another having suitable extension for the reduced cross section part of the pin.

Another development of the invention provides that in the operating position of the pin, the free end portion thereof is centered in a recess of the die, or of the die support. In the first instance, a special shape would be needed, particularly a two-part die. The purpose of the free end centering is not only to bring the pin into exact alignment with the die, but also to brace it laterally, thus enabling it to reliably take up the shocks occurring during the workpiece feed, and the cutting pressure.

A particularly advantageous design in this respect is to embody the seat for the free end portion of the pin as a bore, especially a blind bore, of a centering part which is provided at the die bottom remote from the punch, or at the underside of the die. This centering part forms one part of a two part die with the two parts being fitted together. In this way, an exactly fitting alignment of the centering part with the die is obtained.

The centering part is provided with an opening for the passage of the punching or nibbling chips and is constructed as a spoked wheel. The openings between the spokes exceed by far the size of the chips, so that the chips are easily removed in the same way as in conventional stamping and nibbling machines. The centering part is preferably inserted in a recess which is provided at the die side remote from the punch. With a centering part not projecting below the "underside" of the die, the two parts may be received in a simple cavity of the die seat and held fast in a known manner.

The free end portion of the pin is advantageously composed of two elements with one element being firmly retained in the recess of the centering part and the two elements being centered relative to each other. One of the two elements may be made in one piece with the centering part.

One of the elements of the free end portion of the pin is designed with a centering tip and the other element is designed with a conical cavity and the centering tip is located below the upper edge of the die. The term "below" relates to an arrangement as shown in the drawings, namely with the punch above the die. The other element of the end portion of the pin, comprising a conical cavity having the same acute angle as the portion with the centering tip projects into the interior of the die and particularly, extends through the cutting zone of the die.

In accordance with a feature of the invention, the punch is received within and secured against displacement in respect to the rotation of a ram and by means of a device within the ram guide, the ram can be retracted beyond its upper dead center position through an amount by which the pin in an operating position, projects beyond the cutting edge of the punch.

Upon lowering the ram with the punch by means of the auxiliary device into the upper dead center position thereof, and with a workpiece sheet placed in the operating area, the free end of the pin or the respective end element, butts against the workpiece surface remote from the die, provided that the workpiece is not prepierced. If then the punch executes its working stroke, pin and punch are displaced relative to each other until the punch has completely cut and penetrated the workpiece. The spring which has become compressed during the operation now drives the pin further downwardly until the pin end is stopped by the centering part, or the respective mating element. The pin remains in this stopped position even after the ram with the punch have executed their return stroke.

Accordingly it is an object of the invention to provide an improved stamping or nibbling machine which includes a punch which is driven by a member such as a ram to engage and cut chip from a workpiece, which is positioned relative to a counter die having an opening therethrough and wherein the punch is a hollow member having displacement means for a centering pin which is carried for reciprocation in the punch and wherein the pin may be separately displaced.

A further object of the invention is to provide a stamping or nibbling machine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
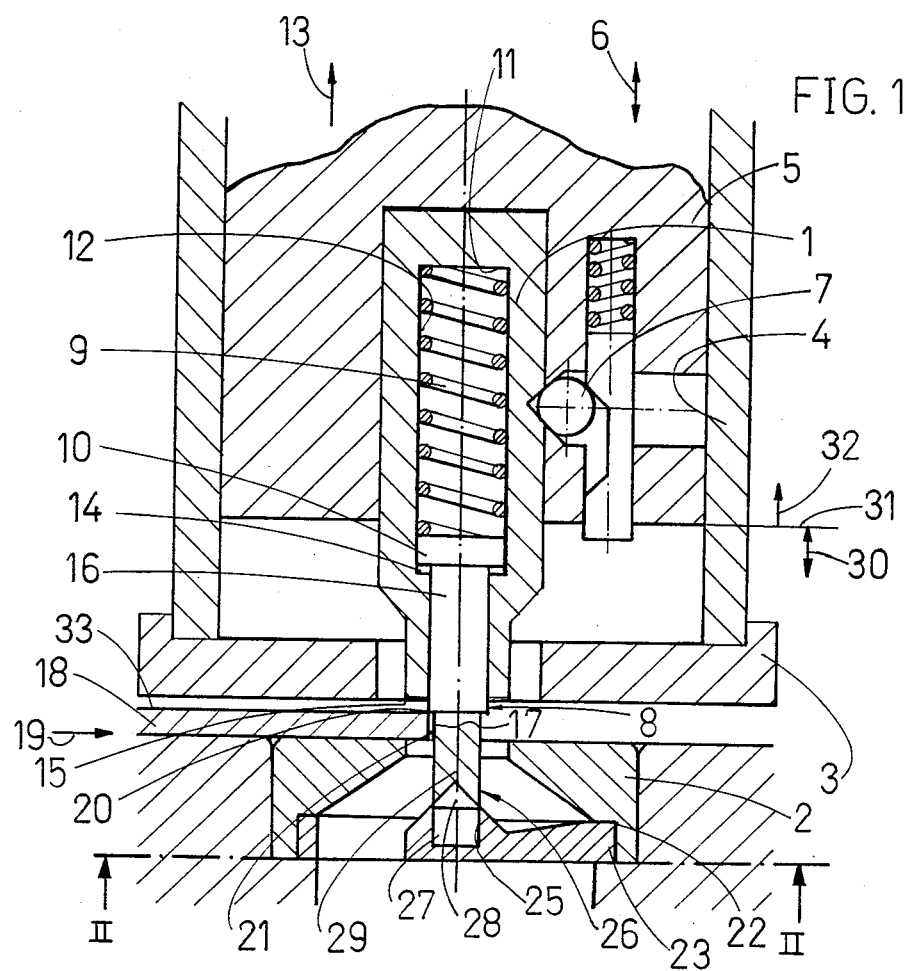
FIG. 1 is a partial sectional view of a stamping or nibbling machine in the zone of a tool holder thereof, constructed in accordance with the invention.

Referring to the drawings in particular the invention embodied therein comprises a stamping or nibbling machine for cutting chips from a metal workpiece 18 which comprises a hollow punch generally designated 1 adapted to be driven by a member such as a ram 5 against the workpiece 18 to cut small pieces thereof, such as by stamping or nibbling. The punch cooperates with a die 2 located in alignment with the punch on the other side of the workpiece. A centering pin 8 has one end projecting into the interior of the hollow punch 1 and an opposite end extending out of the punch and is adapted to engage in the opening beyond the position of the workpiece. A displacement mechanism is carried within the hollow punch 1. This mechanism is in the form of a coil spring 9 which acts against a collar portion 10 of the centering pin 8 so that the pin is displaceable into a position outside the range of movement of the workpiece.

The stamping or nibbling machine is thus equipped with a tool set comprising at least the punch 1 and the die 2, and may further include parts such as a stripper 3. The stripper is provided at the lower end of a guide or a so called bell 4, in which the ram 5 can be displaced up and down as indicated by arrow 6. This displacement is effected in a manner known per se, for example by means of an eccentric and ram drive (not shown). Since the punch 1 is coupled to the ram 5 through lock 7 by which it is secured against rotation and relative displacement, the punch follows the reciprocating motion of the ram.

Punch 1 is hollow and accommodates pin 8 and spring 9 for loading the pin, which is designed as a helical compression spring. One end of the spring, the lower one according to FIG. 1, bears against the outwardly projecting collar 10 provided on the inner end of the pin, while the other end of the spring 9 bears against a bottom 11 of the cavity of punch 1, designed as a blind bore 12. By slightly lifting punch 1 relative to its shown position, in the direction of arrow 13, the underside of collar 10 applies against a shoulder 14 of punch 1 formed by a reduced diameter portion of the cavity. The reduced cross section of this portion of the cavity corresponds to that of the inside pin portion 16 extending therethrough.

The outside pin portion, i.e. the portion of pin 8 projecting from the punch to the outside as shown in FIG. 1, is further reduced in cross section by a step in the operating position of the pin terminating in a small diameter portion 29 which projects beyond the cutting edge of punch 1. With the punch 1 in its upper dead center position, the pin portion 16 having the larger cross section, still protrudes down into the working space 17 between the punch 1 and the die 2, to a level at which the lower edge of this portion is within the path of displacement of workpiece 18. If now the workpiece is fed in the direction of arrow 19, or, with the workpiece fixed, the tool is moved in the opposite direction, workpiece edge 20 butts against the thicker pin portion 16, whereby the size of the nibbling chips in the direction of arrow 19 is determined. Edge 20 may be an outer or inner edge of the workpiece or even the inner end of a nibbling track which has been provided in advance.

Due to the stepwise reduction of the cross section of the outwardly projecting pin portion, a clear space 21 is formed into which the produced stamping or nibbling chips can expand in the process of their formation, prior to being cut off entirely and falling down through the interior of the die.

Figure 2:
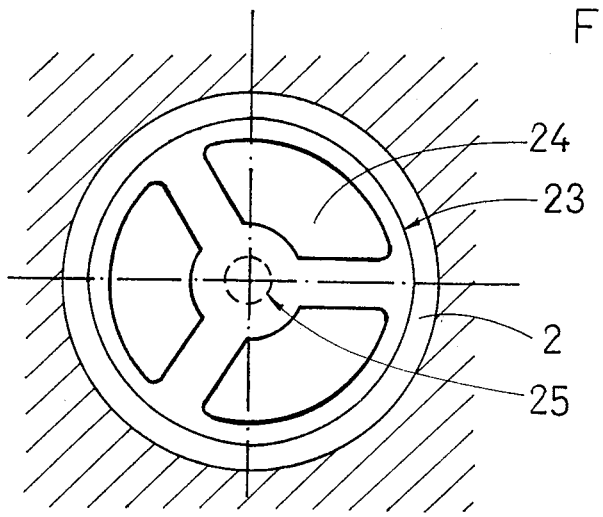
FIG. 2 is a partial sectional view taken along line II—II of FIG. 1.

Die 2 is substantially conventional in its outer dimensions and cutting range. On its side remote from punch 1, it is provided with a recess 22 for a centering part 23 which may be considered as the inner part of a two part die. As shown in FIG. 2, this part has the shape of a spoked wheel, with openings 24 being formed between the spokes through which the separated chips can fall downwardly.

At the center of centering part 23, a recess 25 is provided, which is preferably a blind bore. This recess is intended to receive the free end portion 26 of pin 8. Advantageously, free end portion 26 is designed as a cylindrical stud. However, in accordance with another embodiment shown in FIG. 1, free end portion 26 may be designed to cooperate with another part, i.e. its function may be performed by two elements of which one, element 27, is firmly retained in recess 25. The projecting top of this element 27 forms a centering tip 28. The other element 29 is provided with a conical cavity having a cone angle corresponding to that of centering tip 28. With the two elements coupled to each other, a satisfactory centering is obtained and pin 8 is securely laterally braced to withstand the occurring forces and shocks.

In FIG. 1, the working stroke of punch 1 is indicated at 30, with line 31 indicating the upper dead center position of the free end of the ram 5. By means of a suitable mechanism (shown schematically only as an arrow 32) the ram 5 and the punch 1 with pin 8 can be lifted in the direction of arrow 32, above the indicated upper dead center position, until pin 8 is entirely withdrawn from operating space 17 and workpiece 18 can be displaced before the start of the stamping or nibbling operation, without being obstructed by the pin.

As soon as workpiece 18 is adjusted in position relative to the punch 1 and the die 2, the ram and the parts, operatively connected thereon are lowered in the direction opposite to arrow 32, into the upper dead center position indicated at 31. During this motion, free end portion 26 of the pin, or, with the two-element design, a free end of element 29, butts against the upper side 33 of the workpiece 18 so that the pin cannot follow the further motion of the ram and the punch. It is assumed, of course, that the workpiece has not been perforated in advance and extends up to a point beneath the free end portion 29 of the pin 8. During the further downward motion of ram 5 and punch 1, and, particularly during the working stroke 30, pin 8 is still farther pushed into the blind bore 12, against the resistance of spring 9. At the end of the working stroke, the pin is suddenly impelled downwardly by spring 9, in a direction opposite to arrow 13, and becomes coupled to centering part 23, or element 27. At the end of the return stroke, spring 9 is then relieved again, completely, or at least substantially. In the course of further working strokes, pin 8 remains in this position relative to die 2.

Figure 3:
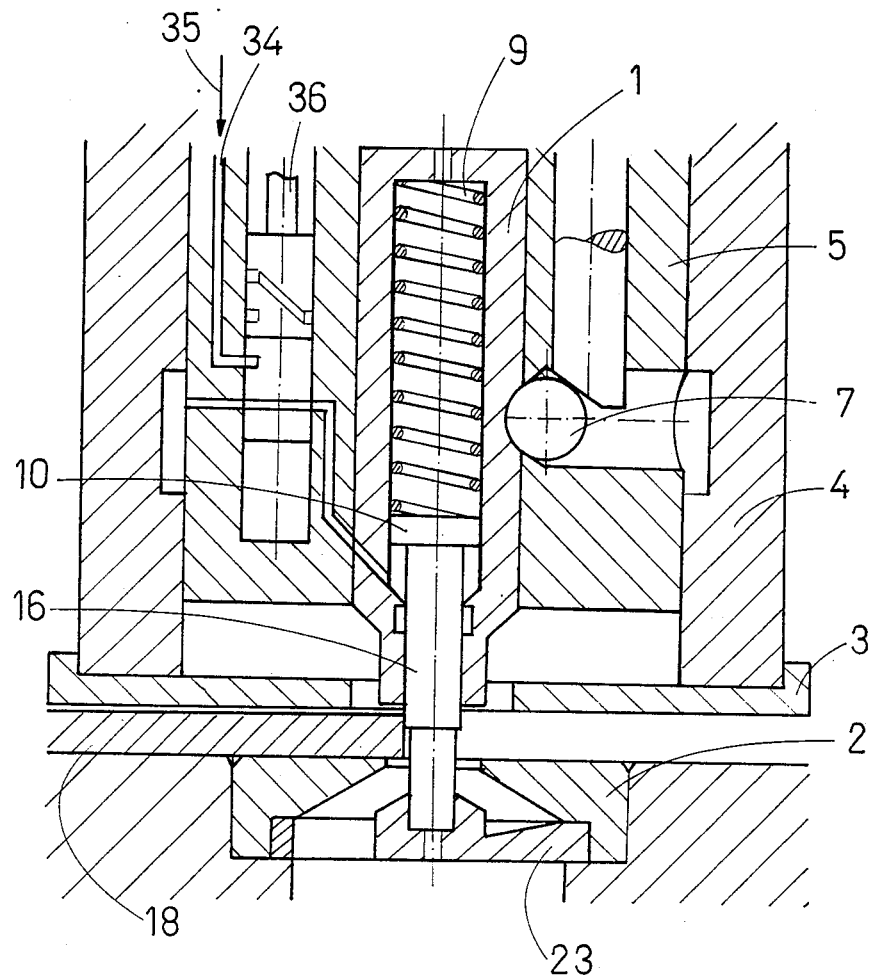
FIG. 3 is a view similar to FIG. 1 of another embodiment of the invention.

The embodiment of FIG. 3 differs from that according to FIG. 1 substantially only in the provision of an additional compressed air line 34 which leads through a multi-way valve 36 to cavity or bore 12 of punch 1, to open therein beneath collar 10 of pin 8. As soon as line 34 is opened by valve 36, compressed air flows in the direction of arrow 35 and displaces pin 8 against the action of spring 9 into bore 12 of punch 1, until the ends are at a level such that workpiece 18 can freely be displaced. Upon closing compressed air line 34 by valve 36, spring 9 pushes pin 8 into the lower end position thereof. FIG. 3 also shows the centering part with no element 27 in its bore so that the end of the pin may be seated there.

While specific embodiments of the invention have been shown and described in detail to illustrate the application of the principles of the invention, it will be understood that the invention may be embodied otherwise without departing from such principles.

What is claimed is:

1. A stamping or nibbling machine for cutting chips from a metal workpiece, comprising a hollow punch adapted to be driven against a workpiece to cut small pieces thereof, a die having a die opening adapted to be located in alignment with the punch and on an opposite side o the workpiece, a centering pin having one end projecting into the interior of said punch and an opposite end extending out of said punch and adapted to engage in the die opening beyond a position of the workpiece, a displacement mechanism carried in said hollow punch and acting on said pin to effect displacement of the pin relative to the punch toward the die, and a centering member carried in said die having a smaller diameter opening than said die opening for receiving an opposite end of said pin to center said hollow punch, said pin having an end portion at its opposite end of reduced diameter from a remaining portion of said pin, adapted to engage in said small diameter opening of said centering member, said end portion having a length so that with said end portion engaged in said small diameter opening, said remaining portion of said pin engages a workpiece on said die and defines a space between the workpiece and said end portion to allow a passage of chips from the workpiece, said end portion of said pin including a centering recess facing said die, and a centering element having a centering projection and disposed in said small diameter opening of said centering member, said centering projection of said centering element cooperating with said centering recess of said pin end portion for centering said punch.

2. A stamping or nibbling machine according to claim 1, wherein said displacement mechanism includes a spring loaded in the direction of its operating position between said punch and said centering pin, said punch being movable against its working direction beyond its upper dead center position up to a position in which said pin in its most extended position is extended beyond the path of movement of said workpiece.

3. A stamping or nibbling machine according to claim 1, wherein said displacement mechanism comprises a spring located between said pin and the interior of said punch and including means acting on said pin for applying a pressure thereto in an opposite direction.

4. A stamping or nibbling machine according to claim 1, wherein said centering pin has a widened collar portion on its end located in the interior of said punch and said displacement mechanism comprising a spring engaged against said widened collar portion and the interior of said punch.

5. A stamping or nibbling machine according to claim 1, wherein said small diameter opening is a blind hole of said centering member.

6. A stamping or nibbling machine according to claim 1, including a ram having a recess into which said punch extends, means associated with said ram for locking said punch with said ram against rotation and displacement, said ram being retractible beyond its upper dead center position to a position in which said pin in operating position projects beyond the cutting edge of said punch.

7. A stamping or nibbling machine according to claim 1, wherein said centering member comprises a spoked wheel having a center part carrying said small diameter opening.

8. A stamping and nibbling machine according to claim 1 wherein said centering recess comprises a conical cavity and said centering projection comprises a conical projection corresponding in shape to said conical cavity.

* * * * *